United States Patent
Smith

(10) Patent No.: US 10,197,668 B2
(45) Date of Patent: Feb. 5, 2019

(54) EIGHTH WAVE CORNER CUBE RETARDER FOR LASER RADAR

(71) Applicant: Nikon Corporation, Tokyo (JP)

(72) Inventor: Daniel Gene Smith, Tucson, AZ (US)

(73) Assignee: Nikon Corporatin, Tokyo (JP)

( * ) Notice: Subject to any disclaimer, the term of this patent is extended or adjusted under 35 U.S.C. 154(b) by 381 days.

(21) Appl. No.: 14/914,616

(22) PCT Filed: Aug. 29, 2014

(86) PCT No.: PCT/US2014/053585
§ 371 (c)(1),
(2) Date: Feb. 25, 2016

(87) PCT Pub. No.: WO2015/031858
PCT Pub. Date: Mar. 5, 2015

(65) Prior Publication Data
US 2016/0209496 A1    Jul. 21, 2016

Related U.S. Application Data

(60) Provisional application No. 61/872,581, filed on Aug. 30, 2013.

(51) Int. Cl.
*G01C 3/08* (2006.01)
*G01S 7/481* (2006.01)
(Continued)

(52) U.S. Cl.
CPC .......... *G01S 7/4812* (2013.01); *G01S 7/4818* (2013.01); *G01S 7/499* (2013.01); *G01S 17/08* (2013.01);
(Continued)

(58) Field of Classification Search
CPC .......... G01S 17/42; G01S 17/66; G01S 17/08; G01S 7/4812; G01S 7/4818; G01S 7/499;
(Continued)

(56) References Cited

U.S. PATENT DOCUMENTS 3,109,049 A    10/1963  Williams
5,963,325 A    10/1999  Johs et al.
(Continued)

FOREIGN PATENT DOCUMENTS

WO    WO 2013/093633    6/2013

OTHER PUBLICATIONS

International Search Report and Written Opinion from International Application No. PCT/US2014/053585, dated Feb. 25, 2015, 10 pages.

*Primary Examiner* — Mark Hellner
(74) *Attorney, Agent, or Firm* — Klarquist Sparkman, LLP

(57) ABSTRACT

Laser radar systems include focusing optical systems having a retroreflector such as a corner cube that is translatable with respect to an objective lens. The retroreflector provides a selected retardance to an interrogation optical beam that is directed to a target as well as to a returned portion of the interrogation optical beam that is directed to a detection system. Typically, an input linearly polarized interrogation beam is returned by the retroreflector as a circularly polarized beam that is directed to the target. Returned beam portions from the target are coupled by the retroreflector to a detection system in a linear polarization that is orthogonal to that of the input linearly polarized optical beam. The retroreflector produces state of polarization changes based on retardance associated with total internal reflection from coated or uncoated optical surfaces. Retroreflector surfaces that are not to introduce retardance are coated with suitable zero or low retardance coatings.

36 Claims, 16 Drawing Sheets

(51) Int. Cl.

| | |
|---|---|
| *G01S 17/42* | (2006.01) |
| *G01S 17/66* | (2006.01) |
| *G01S 7/499* | (2006.01) |
| *G02B 5/04* | (2006.01) |
| *G01S 17/08* | (2006.01) |
| *G02B 5/122* | (2006.01) |
| *G02B 5/30* | (2006.01) |

(52) U.S. Cl.
CPC ............. *G01S 17/42* (2013.01); *G01S 17/66* (2013.01); *G02B 5/04* (2013.01); *G02B 5/122* (2013.01); *G02B 5/3083* (2013.01); *G01S 7/4813* (2013.01)

(58) Field of Classification Search
CPC ....... G01S 7/4813; G01B 5/3083; G01B 5/04; G01B 5/122

USPC ...................................................... 356/4.01
See application file for complete search history.

(56) References Cited

U.S. PATENT DOCUMENTS

| | | | |
|---|---|---|---|
| 8,441,649 B2 | 5/2013 | Wang et al. | |
| 8,724,095 B2* | 5/2014 | Goodwin | G01S 7/4812 356/3.01 |
| 9,625,368 B2* | 4/2017 | Goodwin | G01N 21/01 |
| 2003/0223080 A1 | 12/2003 | Hill | |
| 2009/0219618 A1 | 9/2009 | Chipman et al. | |
| 2011/0157598 A1 | 6/2011 | Wang et al. | |
| 2011/0292401 A1 | 12/2011 | Barbarossa et al. | |
| 2013/0099957 A1* | 4/2013 | Goodwin | G01S 7/4812 342/54 |
| 2013/0194563 A1 | 8/2013 | Goodwin et al. | |

\* cited by examiner

EIGHTH WAVE CORNER CUBE RETARDER FOR LASER RADAR

CROSS REFERENCE TO RELATED APPLICATION APPLICATIONS

This application is the U.S. National Stage of International Application No. PCT/US2014/053585, filed Aug. 29, 2014, which was published in English under PCT Article 21(2), which in turn claims the benefit of U.S. Provisional Application No. 61/872,581, filed Aug. 30, 2013, which is hereby incorporated by reference in its entirety.

FIELD

The disclosure pertains to retroreflectors for use in laser radar systems.

BACKGROUND

Laser radar systems have been developed that use retroreflectors such as corner cubes to provide focus adjustment. See, for example, Goodwin et al., U.S. Patent Application Publication 2013/0099957, which is incorporated herein by reference. In some such systems, an interrogation beam makes two passes in a corner cube before being directed to a target. A return beam from the target also makes two passes through the corner cube prior to being directed to a detection system. As a result, the measurement beam associated with a target location experiences twelve reflections at corner cube surfaces. Although losses at these surfaces can be relatively low, even a 4% loss per surface effectively reduces available optical power by about 60%, limiting laser radar performance. Apparatus and methods that exhibit reduced optical losses are needed.

SUMMARY

Focus systems for a laser radar comprise a prism that includes a plurality of reflective surfaces, wherein at least one surface is configured to receive an interrogation optical beam in a first state of polarization and reflect the interrogation optical beam in a second state of polarization. A return reflector is situated to receive the interrogation beam in the second state of polarization from the prism, and reflect the interrogation beam back to the prism, wherein the prism is translatable with respect to the return reflector or the return reflector is translatable with respect to the prism so as to establish a focus distance for the interrogation optical beam at a target. In some examples, the prism is a corner cube, and the at least one surface is configured as a $\lambda/8$ retarder. In typical examples, the prism includes a first surface situated to reflect the interrogation beam from a beam source, wherein the first surface provides a retardance of about $\lambda/8$. In other examples, the first surface has a surface coating that provides the $\lambda/8$ retardance. In still additional examples, at least one of an angle of incidence of the interrogation beam to the first surface or a prism refractive index is associated with the $\lambda/8$ retardance. In other embodiments, the prism includes a second surface configured to receive the interrogation beam from the first surface, wherein the second surface has a coating that provides a retardance of less than $\lambda/50$, $\lambda/100$, or $\lambda/200$. In some examples, the prism is a solid or air-spaced corner cube.

Laser radars comprise a laser that produces an interrogation optical beam in a first state of polarization. An objective lens is situated to direct the interrogation optical beam to a target in a second state of polarization and receive a portion of the interrogation optical beam returned from the target. A focus optical system includes a retroreflector and a return reflector, wherein at least one of the retroreflector and the return reflector is translatable with respect to the objective lens so as to shape the interrogation beam at the target, and further wherein the retroreflector provides a retardance that converts the first state of polarization to the second state of polarization. In some examples, the first state of polarization is a linear state of polarization and the second state of polarization is a circular state of polarization. In other examples, the retroreflector is situated to provide a $\frac{1}{8}$ wave retardance for input beam propagation from an input surface of the retroreflector to the return reflector. According to some embodiments, the retroreflector provides the $\frac{1}{8}$ wave retardance based on reflection at a selected reflective surface of the retroreflector. In some specific examples, the selected reflective surface of the retroreflector is oriented with respect to the interrogation beam to provide $\frac{1}{8}$ wave retardance by total internal reflection. In still further examples, a multilayer coating is situated at the selected reflective surface of the retroreflector, wherein the $\frac{1}{8}$ wave retardance is provided by the multilayer coating. In additional representative examples, a low retardance coating is situated at a least one reflective surface of the retroreflector that is different than the selected reflective surface. In some embodiments, the retroreflector is a corner cube prism, an air corner cube, or a roof prism. In still further examples, the retroreflector is a crown glass corner cube prism situated so that an angle of incidence of the interrogation optical beam to the selected surface is between 47 and 53 degrees chosen so as to achieve a desired retardance produced by total internal reflection.

Methods of interrogating a target comprise directing an input interrogation optical beam in a first state of polarization to a retroreflector that produces an output interrogation optical beam in a second state of polarization. A focus of the output interrogation optical beam is adjusted by translation of the retroreflector. A portion of the output interrogation optical beam received from the target is detected, and based on the detected portion, at least one of a target dimension or position is estimated. In some embodiments, the retroreflector transforms a received portion of the output interrogation optical beam from the target in the second state of polarization to a third state of polarization that is orthogonal to the first state of polarization. In typical examples, the first state of polarization is a linear state of polarization and the second state of polarization is a circular state of polarization. In some embodiments, the output interrogation optical beam in the second state of polarization is produced by total internal reflection at a selected surface of the retroreflector. In other examples, the output interrogation optical beam in the second state of polarization is produced by total internal reflection at a multilayer coated surface of the retroreflector.

The foregoing and other features, and advantages of the disclosed technology will become more apparent from the following detailed description, which proceeds with reference to the accompanying figures.

DETAILED DESCRIPTION

Figure 1A:
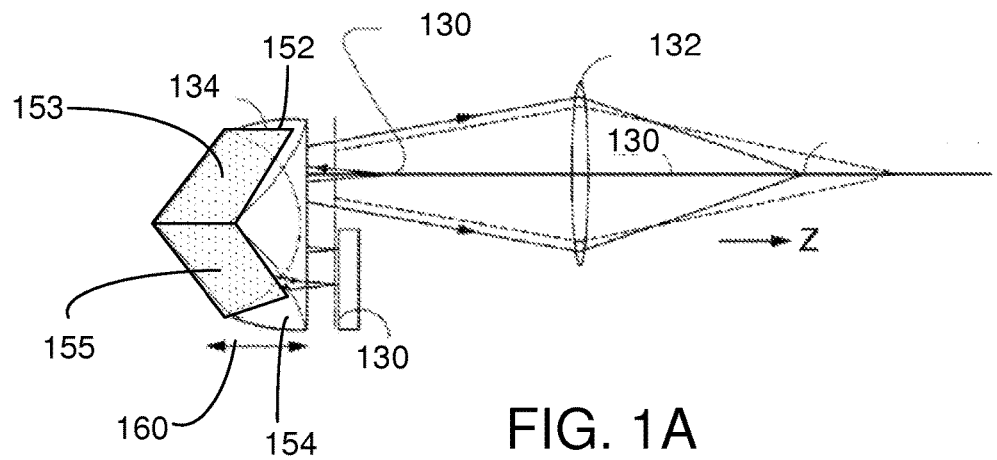
FIGS. 1A-1B illustrate corner cube based focus systems for laser radar.

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items.

The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

In some examples, values, procedures, or apparatus' are referred to as "lowest", "best", "minimum," or the like. It will be appreciated that such descriptions are intended to indicate that a selection among many used functional alternatives can be made, and such selections need not be better, smaller, or otherwise preferable to other selections. As used herein, retardance generally refers to a magnitude of a phase delay applied to different orthogonal states of polarization. For example, a $\lambda/4$ retarder can be referred to as having a $\lambda/4$ retardance. The disclosed examples are described using retardance provided by 0-order or higher order wave plates or other devices. For example, a retardance kin can be provided by a device associated with a retardance given by $\lambda/n+2m\pi$, wherein m is an integer. Wave plates for which m≠0 typically exhibit greater temperature variation of retardance, and variation in retardance as a function of wavelength. Unless indicated otherwise herein, devices for which m=0 (so-called 0-order devices) or devices for which m≠0 (so-called multiple order waveplates) can be used.

In the examples discussed below, a measurement beam in a first state of polarization is converted to be in a second state of polarization (typically, by reflection at one or more surfaces of a corner cube or other retroreflector) as delivered to a target. In these examples, state of polarization changes due to birefringence (and the associated retardance) in lenses, mirrors, optical coatings are assumed to be zero or very small. However, while these additional retardances cause additional polarization changes, a suitable polarization state change can be produced with a corner cube surface reflection, but an additional retardation plate used to prepare an appropriate state of polarization for processing by the corner cube. For convenient illustration, such additional retardation devices are not shown in the examples but can be included as needed.

Total internal reflection (TIR) can be used to avoid losses due to reflections at surfaces of retroreflectors or prism assemblies used in laser radar systems. For example, a corner cube used in laser radar focusing can reflect laser beams based on TIR, and metallic or other absorbing reflective coatings are not needed. In addition, such total internal reflections can be arranged to provide a selected retardance so as to, for example, convert a linear input polarization to a preferred elliptical output polarization. For example, reflections within the corner cube that do not divide the beam between multiple facets can be arranged to serve as a retarder that converts linear polarization at 45 degrees into circular polarization in the two passes that a laser beam makes propagating from an input fiber to a target. A suitable $\lambda/8$ reflective coating can be provided on the appropriate corner cube surface. In addition, other reflective surfaces can be provided with coatings to avoid additional retardance. For example, some surfaces of a corner cube can be provided with low or no-retardance coatings. Angles of incidence can be selected to provide suitable retardance (or low retardance), but surface modification with a non-absorbing thin film coating is generally convenient.

Figure 1B:
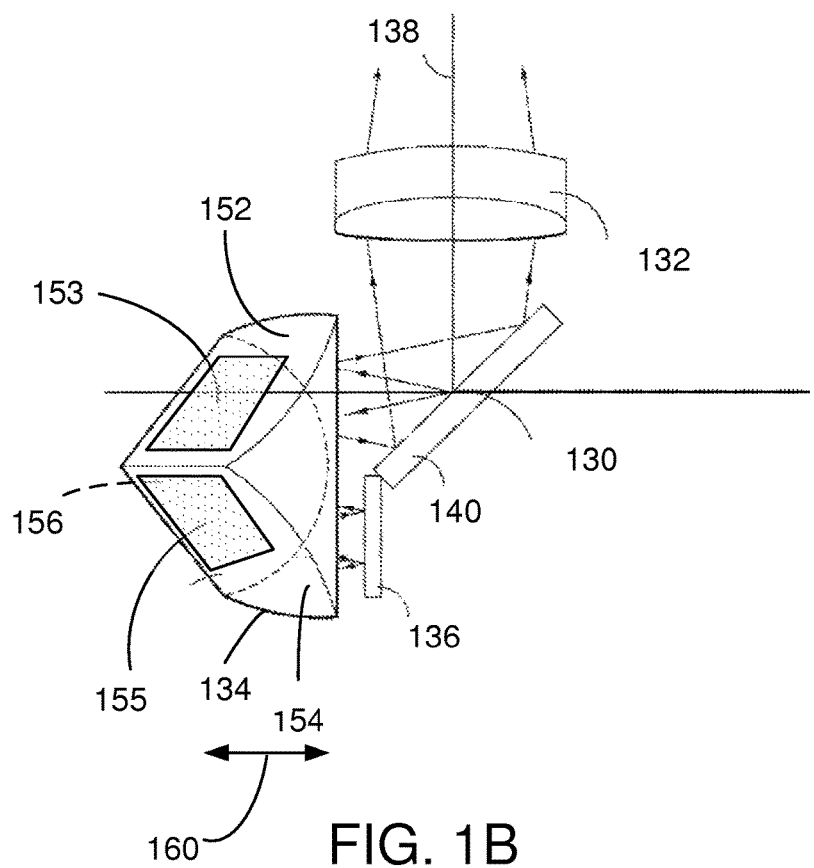

FIGS. 1A-1B illustrate portions of laser radar optical systems. A fiber 130 is situated to direct an optical beam to a corner cube 134 having cube faces 152, 154, 156. As shown in FIGS. 1A-1B, cube faces 152, 154 are provided with retardance or non-retardance based coatings 153, 155, respectively. The cube face 156 is shown as uncoated for ease of illustration. The optical beam is directed to a return mirror 136 or other return reflector through the corner cube 134. The return mirror 136 redirects the optical beam back through the corner cube 134 to an objective lens 132 that directs an interrogation beam to a target along an axis 138. Portions of interrogation beam scattered, reflected, or otherwise returned follow the same path in reverse, back to the objective lens, the corner cube 134, and the return mirror 136 so as to be collected by the fiber 130. The example of FIG. 1B also includes a reflector 140 through which the fiber 130 extends. The corner cube 134 is situated so as to be translatable along an axis 160 for beam focusing.

If the beam from the fiber 130 is first incident to the surface 154, the surface coating 155 can be configured to provide a suitable retardance, typically $\lambda/8$. The coating 153 can be a zero or low retardance coating. A similar low retardance coating can be provided at the surface 156.

Figure 2:
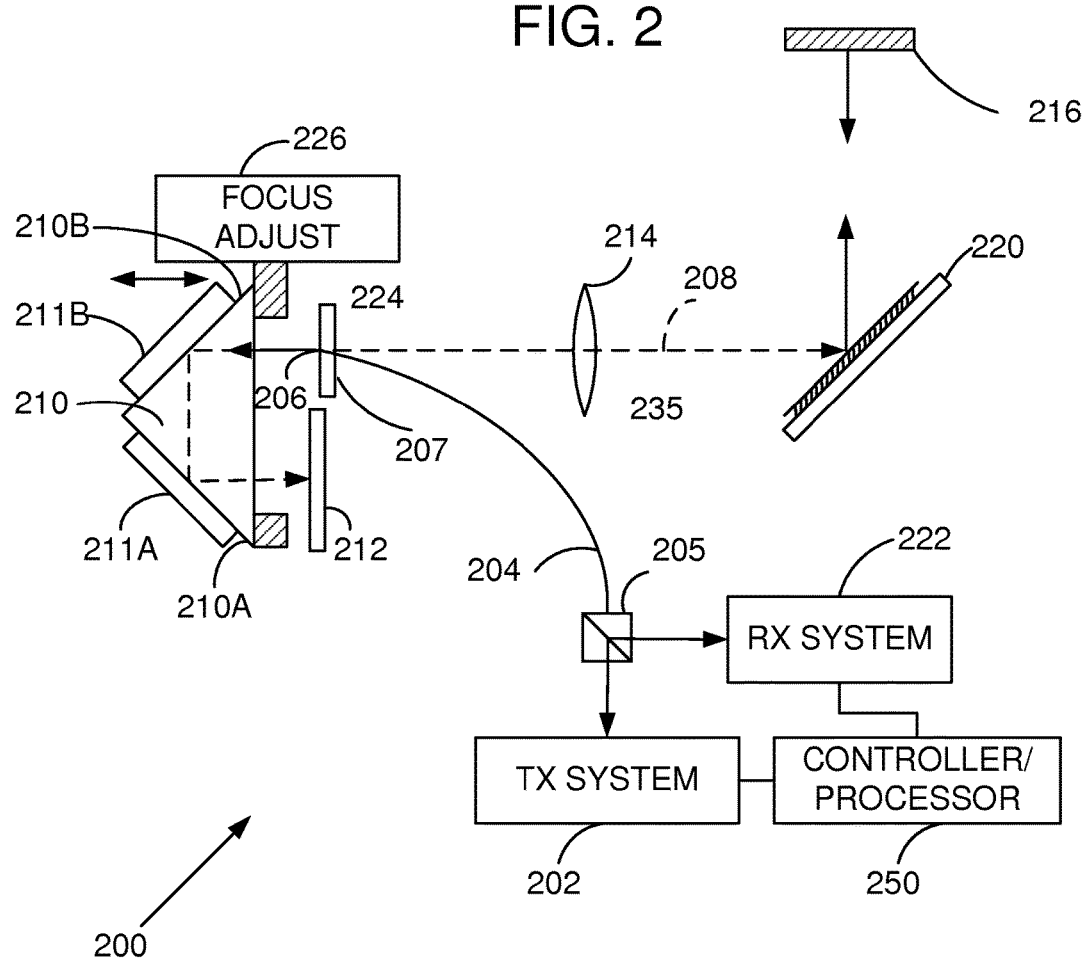
FIG. 2 illustrates a right angle prism based focus system for laser radar.

With reference to FIG. 2, a laser radar system 200 includes a transmitter system 202 that is configured to couple an optical beam from one or more laser diodes or other light sources to an optical fiber 204 through a beam splitter 205. The optical beam exits the optical fiber 204 at a fiber end 206, typically a cleaved or plane polished fiber end, and is directed along an axis 208 to a right angle prism 210 and a return mirror 212. The return mirror is 212 is situated along the axis 208 as folded by the right angle prism 210 to return the beam through the right angle prism 210 to an objective lens 214 that produces a focused interrogation or tracking optical beam that is directed to a target 216 with a scanning assembly 220. Focus is typically adjusted by translating the right angle prism 210 along the axis 208. At least some portion of the interrogation beam is scattered, reflected, or otherwise returned to the objective lens 214 and coupled via the right angle prism 210 and the return mirror 212 to the fiber end 206 and to a receiver system 222. The right angle prism 210 is secured to a focus mechanism 226 that is configured to translate the right angle prism 210 along the axis 208 to focus the interrogation beam at particular distance. The returned portion of the interrogation beam can be used in laser radar processing to provide target coordinates.

The right angle prism 210 includes surfaces 210A, 210B having respective surface coatings 211A, 211B as shown in FIG. 2. The surface coating 211B can be selected to serve as a $\lambda/8$ retarder, and a linear state of polarization (SOP) of an input beam from the fiber surface 206 oriented to have equal s- and p-components with respect to the surface coating 210B. Propagation from the fiber surface 206 to the lens 214 involves two reflections from the surface 210B, and thus the input linear SOP becomes an output circular SOP. The coating 211A is selected to reduce, minimize, or eliminate any retardance associated with reflection at the surface 210A. In other examples, the coating 210A provides $\lambda/8$ retardance and the surface coating 211B is selected to introduce little or no retardance. In still other examples, each of the coatings 211A, 211B can be configured to provide retardances that sum to a desired value. For example, each could be selected to provide $\lambda/16$ retardance, but in other examples, different retardance values could be supplied by each.

The laser radar system 200 also includes a processing system 250 that is coupled to the transmitter system 202 and the receiver system 222. Based on transmitted and received optical signals, the processing system 250 can estimate distances and other coordinates associated with the target, or selected portions of the target 216. Measurement results are provided directly for user inspection or relayed to analysis systems. The laser radar system 200 can be configured as a frequency modulated continuous wave system, as an amplitude or phase modulated system, or a combination of such systems.

The example of FIG. 2 is illustrated with a right angle prism used to provide focus adjustment. Corner cubes or roof prisms (solid or air spaced) are generally superior, but a right angle prism permits convenient illustration. As shown in FIG. 2, s- and p-components correspond at surfaces 210A, 210B, while s- and p-components at corner cube surfaces tend to vary from surface to surface. Thus, a right angle prism permits simple distribution of retardance over both surfaces 210A, 210B. For more complex retroreflectors, s- and p-components and associated directions have more complex relationships at multiple surfaces.

Generally, the fiber 204 is a polarization maintaining fiber and the beam splitter 205 is a polarizing beam splitter. By providing ⅛ wave retardance at the surface 210B, beam portions received from the target can be more efficiently coupled to the receiver system 222. Returned portions can be in a SOP that is perpendicular to that of the incident beam so as to be preferentially directed to the receiver system 222 by the beam splitter 205.

Figure 3:
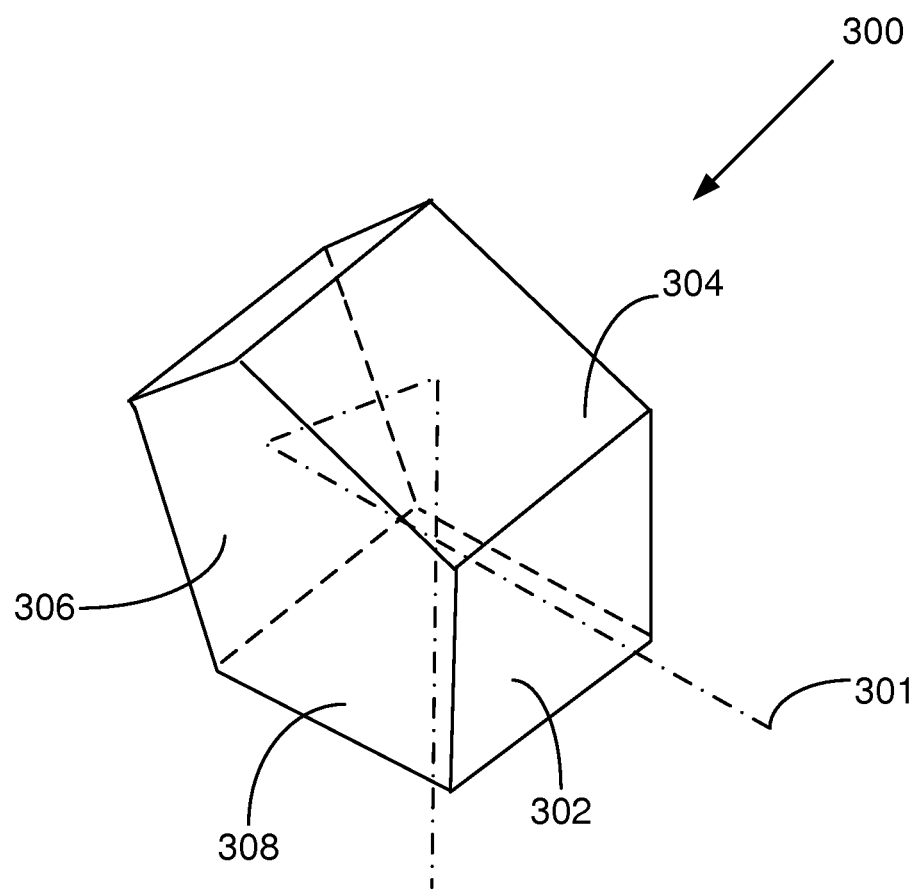
FIG. 3 illustrates a pentaprism that is provided with coatings associated with selected retardances.

FIG. 3 illustrates a pentaprism 300 configured to receive an input beam along an axis 301. Prism surfaces 302, 308 can be antireflection coated, and surfaces 304, 306 can be provided with coatings that provide a selected retardance (including zero retardance). For propagation along the axis 301, s- and p-polarization directions correspond at the surfaces 304, 306, and a selected retardance can be provided as a sum of retardances at each of the surfaces 304, 306. Such a pentaprism can be rotatable so as to scan an interrogation beam with respect to a target.

Figure 4:
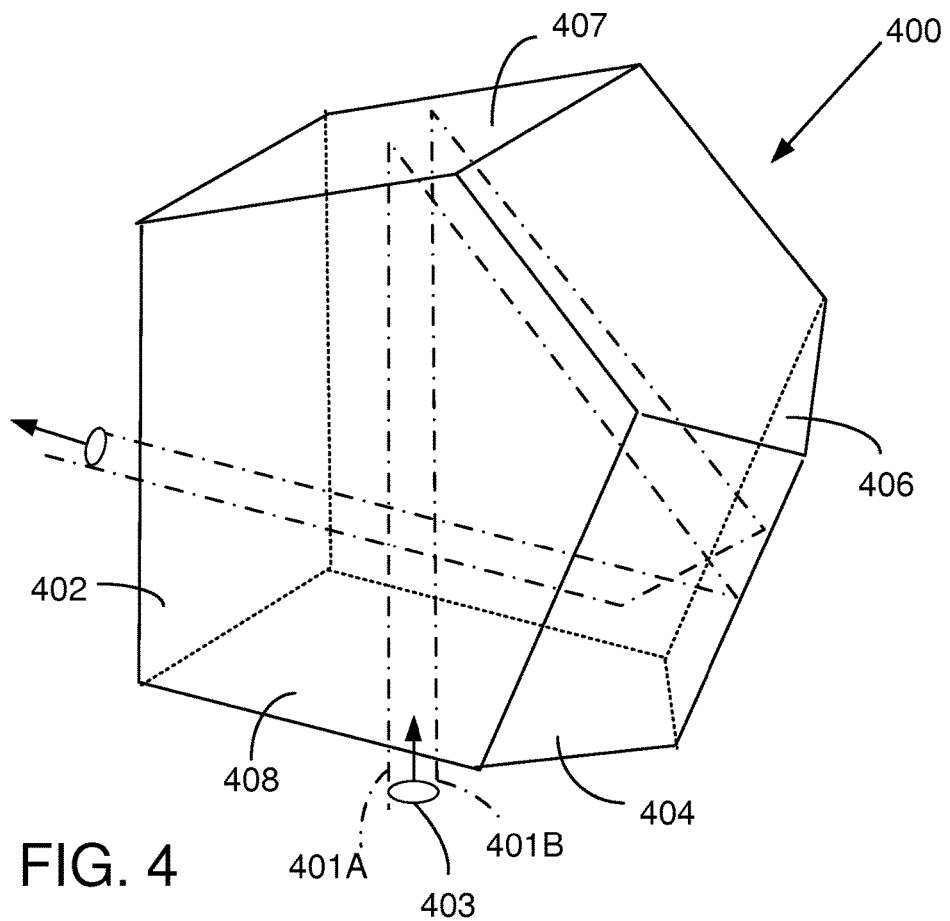
FIG. 4 illustrates a roof prism that is provided with coatings associated with selected retardances.

FIG. 4 illustrates a roof prism 400 situated to receive an input beam 403 having beam portions that propagate along axes 401A, 401B. Prism surfaces 402, 408 can be antireflection coated, and surfaces 404, 406, 407 can be provided with coatings that provide a selected retardance (including zero retardance). Typically surface 407 provides retardance and surfaces 404, 406 are configured to provide little or no retardance. Roof surfaces 404, 406 are shown as splitting an input beam.

Figure 5:
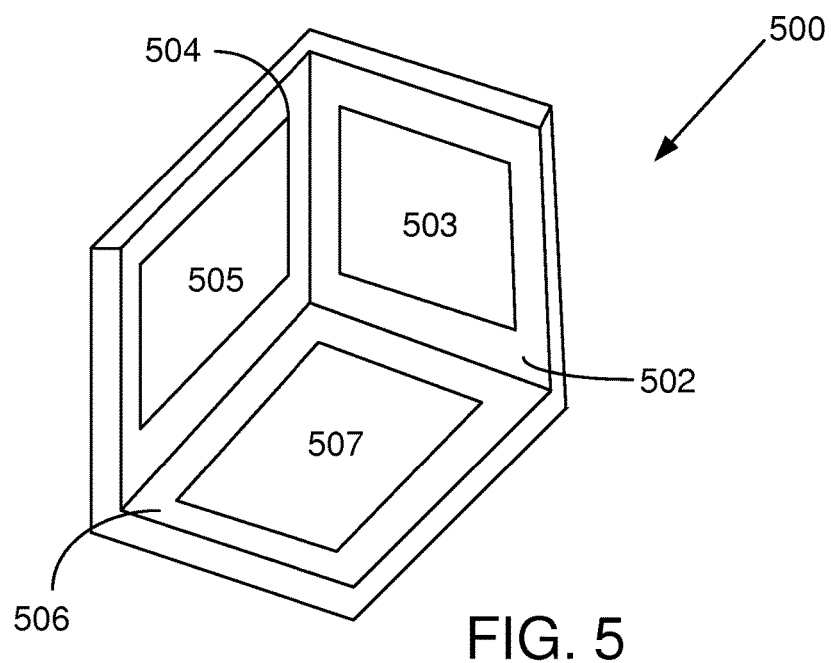
FIG. 5 illustrates an air corner cube that is provided with coatings associated with selected retardances.

FIG. 5 illustrates a hollow corner cube (an air corner cube, or air retroreflector) 500 that includes reflective surfaces 502, 504, 506 provided with coatings 503, 505, 507 that provide a selected retardance (including zero retardance).

An intended retardance can be supplied by a combination of reflections from suitable coatings. An input state of polarization (SOP) is generally arranged so as to have appropriate s- and p-polarization components with respect to a coating intended to provide a retardance.

Figure 6:
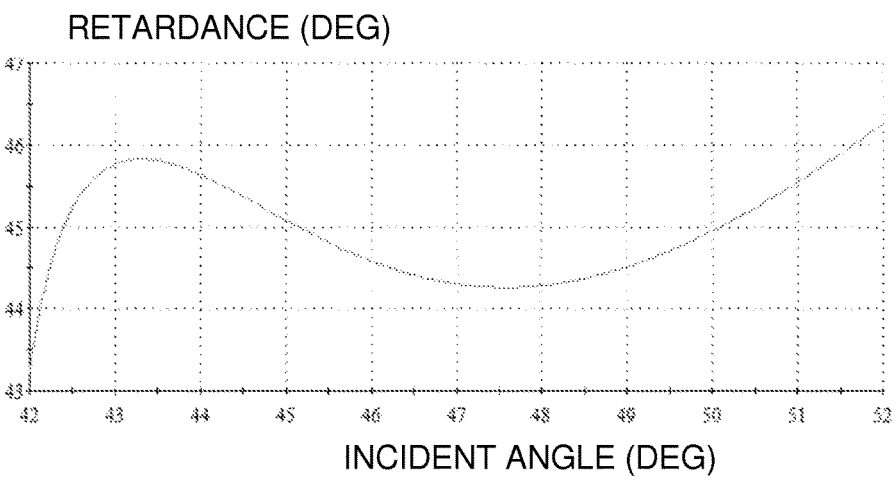
FIG. 6 is a graph of phase difference (retardance) as a function of angle of incidence for total internal reflection at a prism coating exhibiting a nominal $\lambda/8$ retardance.

Coating parameters for a representative $\lambda/8$ coating are provided in Table 1 below. Phase difference as a function of angle of incidence is shown in FIG. 6.

TABLE 1

Coating Parameters for a λ/8 Retardance Coating

| Layer | Material | Refractive Index | Extinction Coefficient | Optical Thickness (FWOT) | Physical Thickness (nm) |
|---|---|---|---|---|---|
| Medium | N-BK7 | 1.50063 | 0 | | |
| 1 | Ta$_2$O$_5$ | 2.1 | 0 | 0.269325 | 198.79 |
| 2 | SiO$_2$ | 1.44402 | 0 | 0.118602 | 127.31 |
| 3 | Ta$_2$O$_5$ | 2.1 | 0 | 0.152114 | 112.27 |
| Substrate | Air | 1 | 0 | | |

Figure 7:
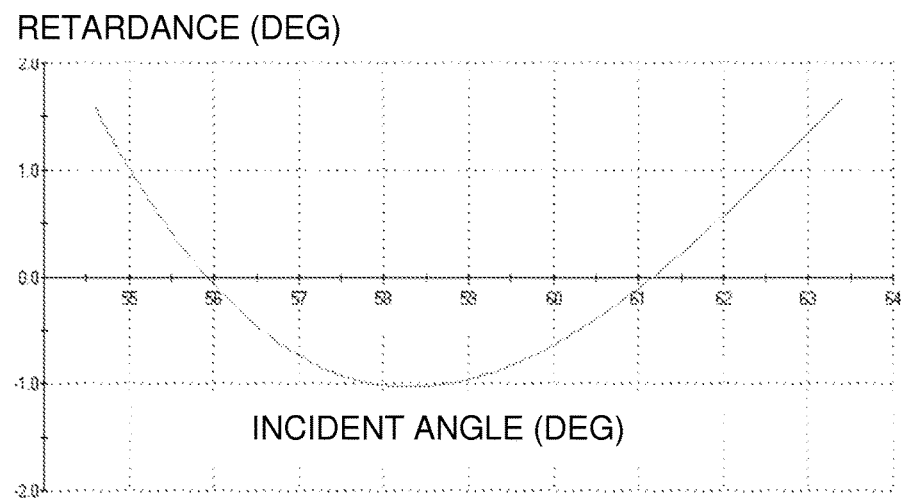
FIG. 7 is a graph of retardance as a function of angle of incidence for a reflective coating that provides zero retardance at an angle of incidence of 45 degrees.

Coating parameters for a representative of zero retardance total internal reflection (TIR) coating (total retardance of Nπ/2, wherein N is an integer) are listed in Table 2 below. FIG. 7 is a graph of retardance as a function of angle of incidence.

TABLE 2

Coating Parameters for a Low (Zero) Retardance Coating

| Layer | Material | Refractive Index | Extinction Coefficient | Optical Thickness (FWOT) | Physical Thickness (nm) |
|---|---|---|---|---|---|
| Medium | N-BK7 | 1.50063 | 0 | | |
| 1 | Ta$_2$O$_5$ | 2.1 | 0 | 0.547631 | 404.2 |
| 2 | SiO$_2$ | 1.44402 | 0 | 0.283035 | 303.81 |
| Substrate | Air | 1 | 0 | | |

Many coatings other than those of Tables 1-2 can be used. In addition, phase change upon TIR without surface coatings can be used. For example, a phase difference δ between s- and p-polarizations upon TIR with an angle of incidence $\theta_i$ and an interface having a refractive index ratio n (less dense to more dense), wherein n is less than one, is given by:

$$\tan\left(\frac{\delta}{2}\right) = \frac{\cos\theta_i \sqrt{\sin^2\theta_i - n^2}}{\sin^2\theta_i}.$$

Figure 8:
FIG. 8 is a graph of retardance as a function of angle of incidence for total internal reflection in a BK-7 glass prism.

By suitable selection of n and $\theta_i$, an intended retardance can be provided, or such retardance can be combined with that produced with dielectric coatings as described in Tables 1-2. FIG. 8 illustrates retardance as a function of angle of incidence for total internal reflection from a surface of an N-BK7 (517642) glass prism at an air/glass interface at a wavelength of about 1.5 μm (n~1.5). As shown in FIG. 8, at angles of incidence of about 50 degrees and 53.4 degrees, a 45 degree (⅛ wave) retardance is produced by total internal reflection. Thus, by appropriate selection of prism material and angle of incidence, a ⅛ wave retardance can be produced at a single surface without multilayer coatings. In some cases, total internal reflection can be produced at interfaces between materials having a refractive index ratio n such that a maximum retardance of ⅛ wave is produced. In this case, a variation in retardance as a function of slight angle of incidence variation is zero. In this case, only one angle of incidence is associated with ⅛ wave retardance.

Figure 9A:
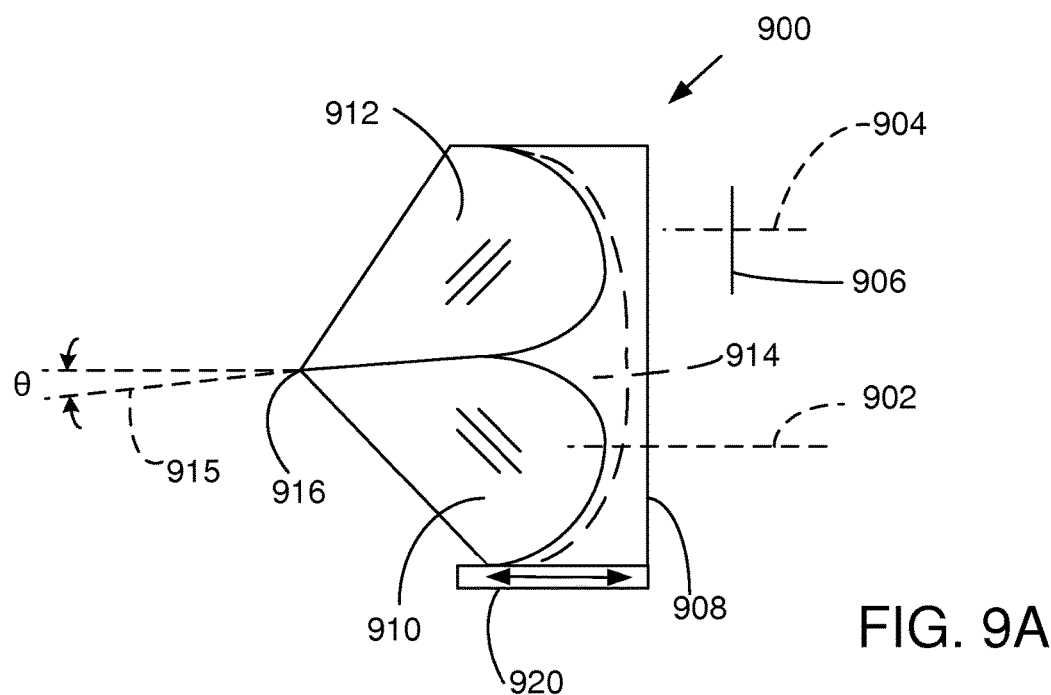
FIG. 9A illustrates a corner cube that produces a ⅛ wave retardance by total internal reflection at a selected surface.

With reference to FIG. 9A, a corner cube 900 is aligned so as to receive an input beam along an axis 902 and produce a reflected beam along an axis 904 that is parallel to and displaced from the axis 902. A return reflector 906 is situated along the axis 904 and returns a received beam along the axis 904 to the corner cube 900. The return reflector 906 is shown as a single reflective surface in FIG. 9, but a multi-layer reflector, a retroreflector, or other reflective device can be used. The corner cube 900 includes a planar input/output surface 908 and corner cube surfaces 910, 912, 914 that can intersect at a vertex 916. A cube diagonal axis 915 is tilted at an angle θ with respect to the axes 902, 904 so that an angle of incidence of an optical beam received along the axis 902 is subject to a ⅛ wave retardance upon total internal reflection at the surface 914. (The cube diagonal axis 915 is an axis that extends from the cube vertex 916 to a virtual vertex corresponding to an opposite corner of the cube defined by the surfaces 910, 912, 914, and the vertex 916). The axis 902 is situated so that an input beam is reflected by the surface 914 to the surfaces 910, 912 and the reflector 906. The surfaces 910, 912 can have coatings that eliminate or reduce any retardance associated with reflection such as those described above. After a second reflection by the ⅛ wave reflective surface 914, a total retardance of ¼ wave has been applied and a linearly polarized input beam can be delivered to a focusing optical system in a circular state of polarization. Upon reflection at a distant target, a returned beam again encounters a total of ¼ wave retardance at the corner cube 900, for a total of ½ wave retardance. The corner cube 900 is generally secured to a translational stage 920 that displaces the corner cube 900 in a direction parallel to the axis 902 so as to adjust beam focus that is achieved with an objective lens (not shown in FIG. 9A).

Figure 9B:
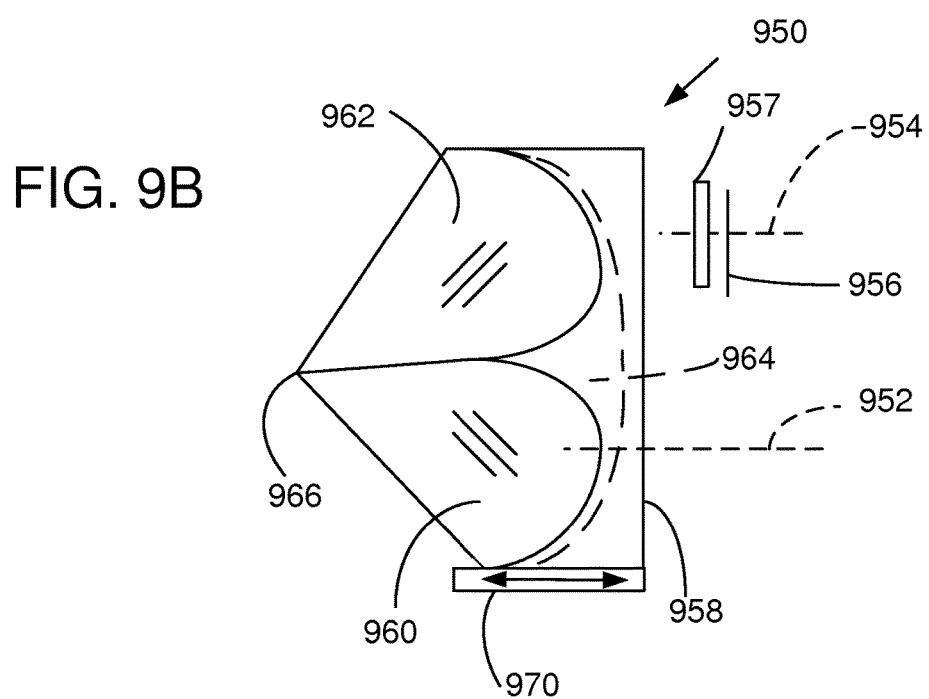
FIG. 9B illustrates a corner cube that produces no net retardance by total internal reflection.

With reference to FIG. 9B, a corner cube 950 is aligned so as to receive an input beam along an axis 952 and produce a reflected beam along an axis 954 that is parallel to and displaced from the axis 952. A return reflector 956 and a retardation plate 957 are situated along the axis 954 and return a received beam along the axis 954 to the corner cube 950. The return reflector 956 is shown as a single reflective surface in FIG. 9B, but a multilayer reflector, a retroreflector, or other reflective device can be used. The corner cube 950 includes a planar input/output surface 958 and corner cube surfaces 960, 962, 964 that can intersect at a vertex 966. The return reflector 956 and the retardation plate 957 are selected to provide a single pass ⅛ wave retardance. (In some examples, the return reflector 956 provides some retardance in addition to or instead of the retardation plate 957). The surfaces 960, 962, 964 of the corner cube 950 are provided with dielectric or metallic coatings so that the corner cube 950 does not alter beam states of polarization. After a second reflection by the return reflector 956, a total retardance of ¼ wave is applied and a linearly polarized input beam can be delivered to a focusing optical system in a circular state of polarization. Upon reflection at a distant target, a returned beam again encounters a total of ¼ wave retardance for a total of ½ wave retardance. The corner cube 950 is generally secured to a translational stage 970 that displaces the corner cube 950 in a direction parallel to the axis 952 so as to adjust beam focus that is achieved with an objective lens (not shown in FIG. 9B).

Figure 10:
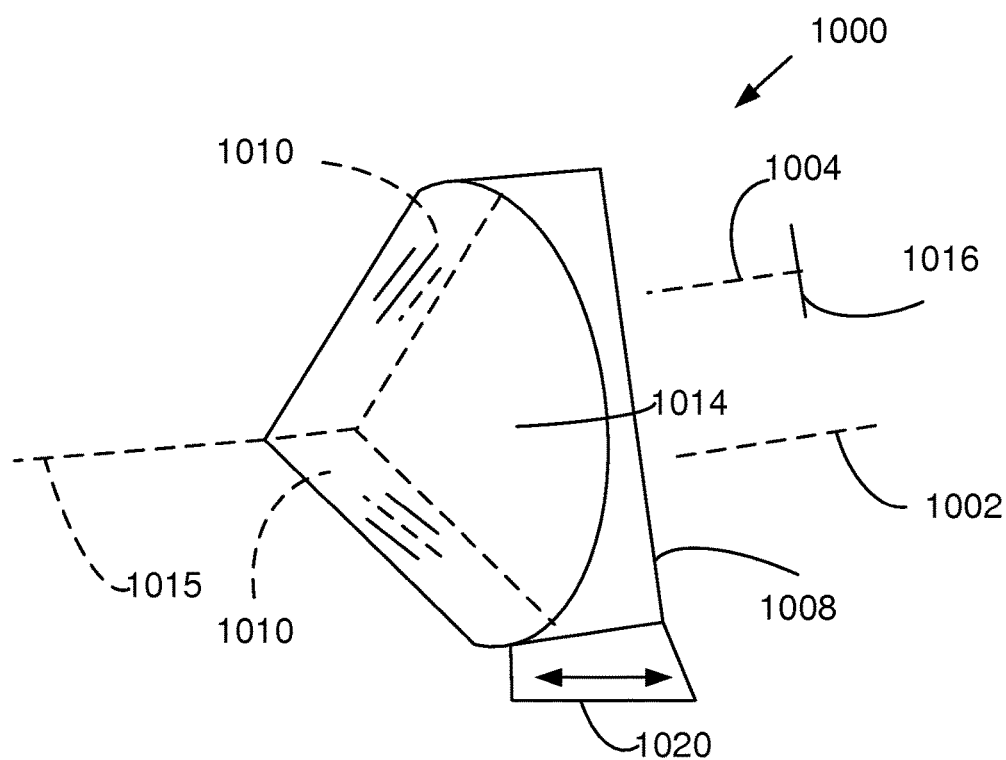
FIG. 10 illustrates a corner cube situated having a surface that produces a ⅛ wave retardance by total internal reflection.

In the example of FIG. 9, the surface 908 is perpendicular to the axes 902, 904, but not to the cube vertex axis 915. In an example shown in FIG. 10, a corner cube 1000 has cube surfaces 1010, 1012, 1014 oriented with respect to a cube diagonal axis 1015 that is rotated with respect to axes 1002, 1004 along which beams propagate. An input beam is directed along the axis 1002 to the surface 1014, and is reflected by the surface 1014 to the surfaces 1010, 1012. A return reflector 1016 receives the multiply reflected input beam along the axis 1004 and returns the beam to the corner cube 1000. After additional reflections by the cube surfaces 1010, 1012, 1014, the beam is directed along an axis parallel to the axes 1002, 1004 to an objective lens and a target region that are not shown in FIG. 10. A corner cube input/output surface 1008 is perpendicular to the cube vertex axis 1015 and a focus translation stage 1020 is situated to translate the corner cube 1000 parallel to the cube vertex axis 1015.

While it may be convenient to apply a phase difference at a single reflective surface, one or more prism surfaces can be used based on surface coatings, refractive index differences, angles of incidence, and input state of polarization. Typically a linear SOP is to be transformed into a circular SOP, but conversion of one elliptical SOP into a selected output elliptical SOP can be accomplished for any elliptical SOP. It is typically convenient to produce a suitable retardance at a single totally internally reflecting surface of a corner cube, and not at multiple corner cube surfaces. Polarization directions for s- and p-polarizations are easily defined for a single surface, but due to the orientation of corner cube surfaces, s- and p-directions associated with different cube surfaces are generally not the same. Thus, determination of total retardance for multiple surfaces is more difficult.

Some illustrated examples are based on prisms in which reflections can be produced by TIR. In other examples (for example, FIG. 5), the beam redirecting properties of prisms can be achieved with air-spaced reflective surfaces such as hollow retroreflectors or corner cubes. Such hollow prisms can include one or more surfaces that produce a predetermined retardance such as λ/8, or minimal or no retardance.

In some examples, return mirrors or other return reflectors exhibit non-zero retardance, either by design or due to device limitations, and conversion of interrogation beam state of polarization can be based on reflective surfaces in a corner cube or other prism, as well as reflective surfaces of the return reflector, or one or more retardation plates situated between the corner cube and return reflector. In still other examples, a corner cube is provided with suitable coatings so as to produce no net retardation, and a return reflector and/or retardation plate are used instead.

Figure 11A:
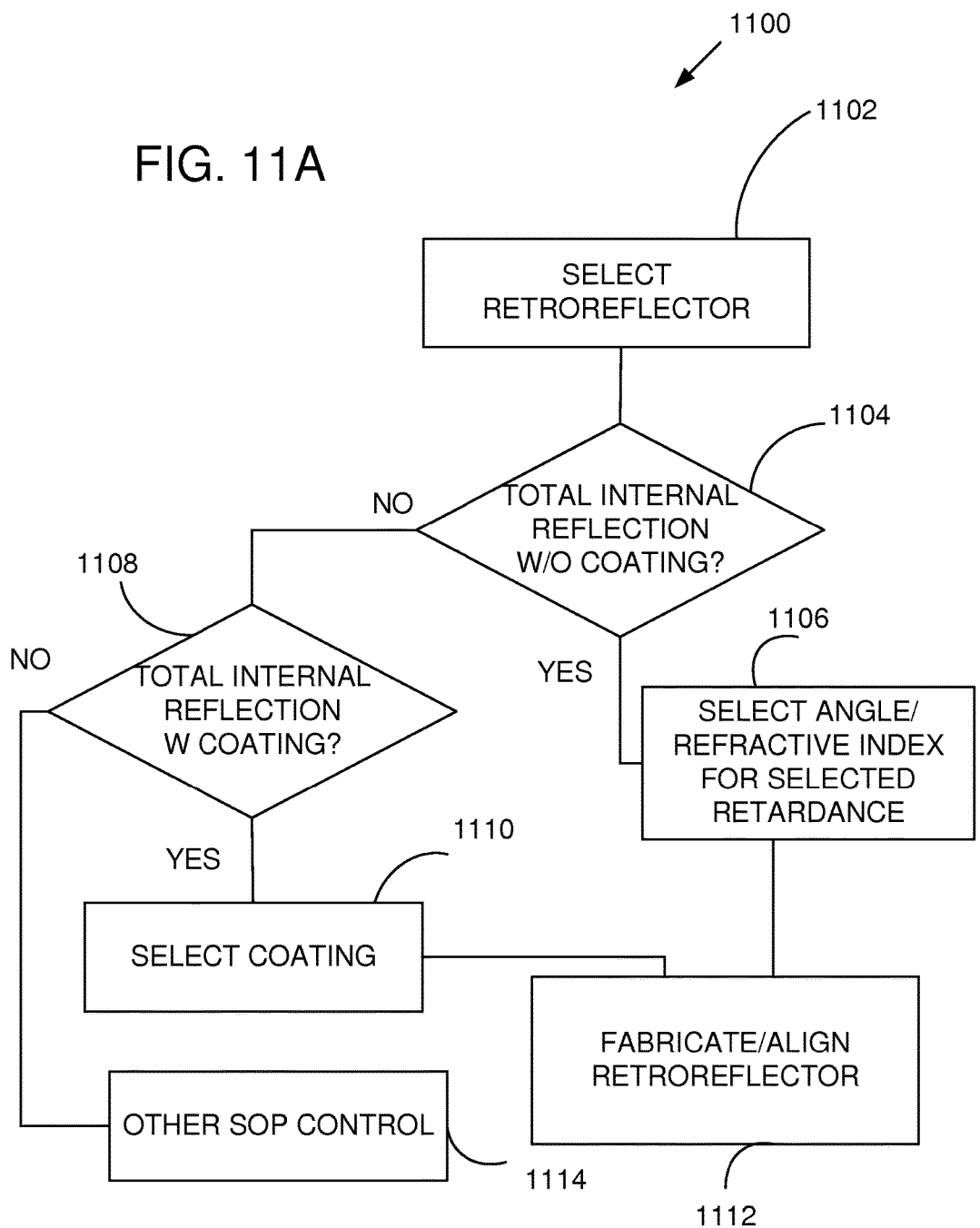
FIG. 11A illustrates a method of selecting a retroreflector to provide a selected retardance.

A representative method 1100 of selecting and orienting a retroreflector is illustrated in FIG. 11A. At 1102, a particular retroreflector is selected such as a corner cube (solid or air spaced), roof prism, or other device. If the selected retroreflector is to be situated to produce a desired retardance based on total internal reflection without multilayer coatings as determined at 1104, an angle of incidence and a retroreflector refractive index are selected at 1106. If a multilayer coating is to be selected as determined at 1108, a suitable coating is selected at 1110. A preferred retroreflector with or without multilayer coatings is fabricated and/or oriented at 1112. In some cases, other methods of SOP control are selected at 1114.

Figure 11B:
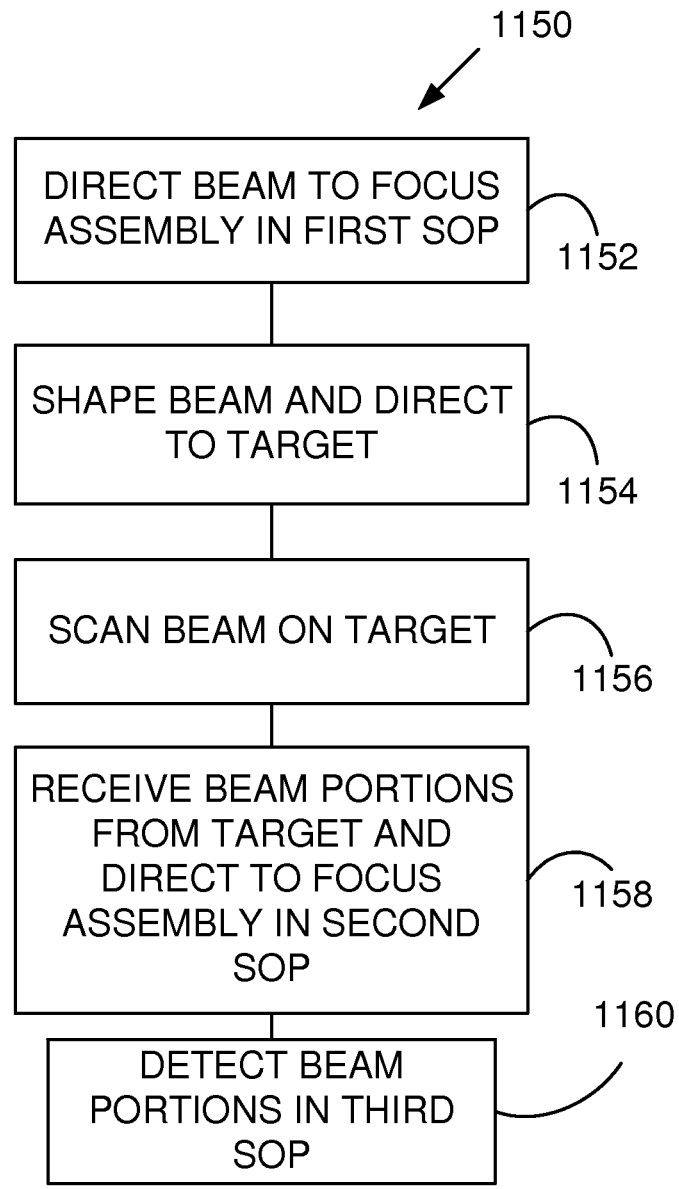
FIG. 11B is a block diagram of a representative method of interrogating an object.

In a representative method 1150 shown in FIG. 11B, an interrogation optical beam in a first state of polarization (SOP) is directed to a focus adjust retroreflector that returns the interrogation optical beam in a second SOP at 1152. At 1154, the returned beam in the second SOP is shaped by an objective lens and directed toward a target. At 1156, the interrogation optical beam is scanned with respect to the target, and at 1158 portions of the interrogation optical beam received from the target are directed to the focus adjust retroreflector. At 1160, beam portions in the second state of polarization from the target are directed to a detection system in a third SOP that is different from (generally perpendicular to) the first SOP.

Figure 12:
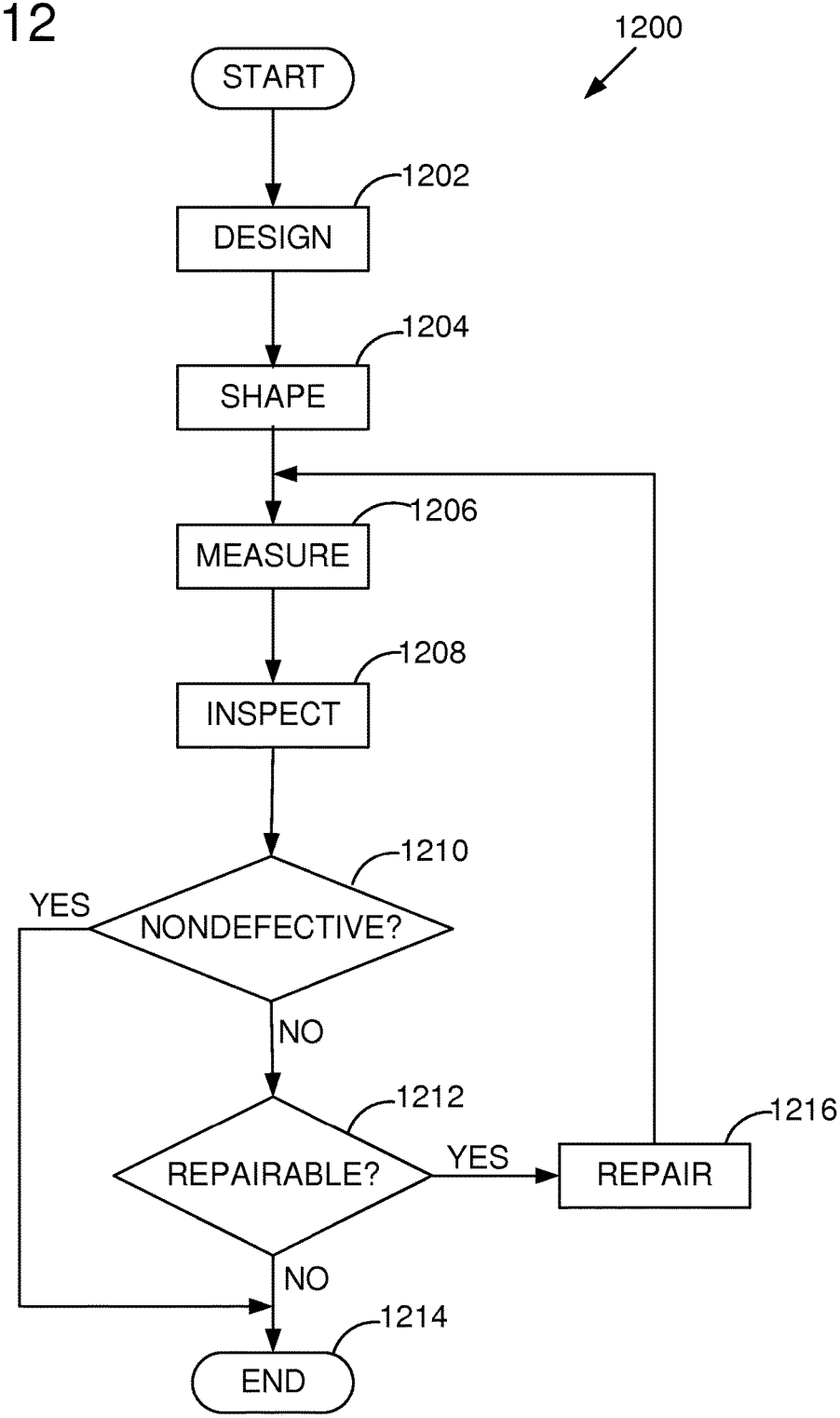
FIG. 12 is a block diagram illustrating a representative manufacturing method that includes profile measurement to determine whether manufactured structures or components are acceptable, and if one or more such manufactured structures can be repaired.
Figure 14:
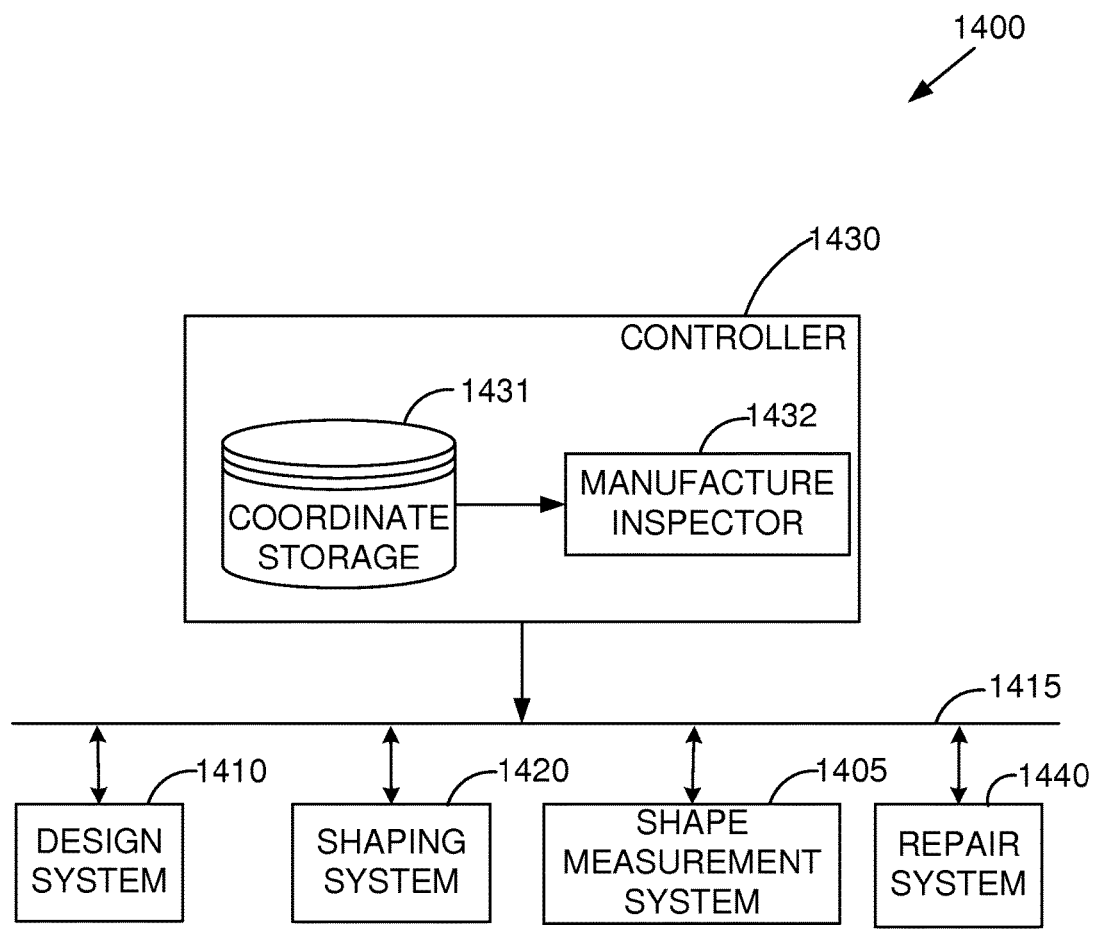
FIG. 14 is a block diagram of a representative manufacturing system that includes a laser radar or other profile measurement system to manufacture components, and assess whether manufactured parts are defective or acceptable.

The methods and apparatus disclosed above can be used in a variety of manufacturing methods and systems. FIG. 12 is a flowchart showing a representative manufacture method 1200 that can incorporate manufacturing systems such as illustrated in FIG. 14. At 1202, design information is obtained or created corresponding to a shape of a structure to be manufactured. At 1204, the structure is manufactured or "shaped" based on the design information. At 1206, coordinates, dimensions, or other features of the manufactured structure are measured with a profile measurement system such as the laser radar systems described above to obtain shape information corresponding to the structure as manufactured. At 1208, the manufactured structure is inspected based on a comparison of actual and design dimensions, coordinates, manufacturing tolerance, or other structure parameters. At 1210, if the manufactured structure is determined to be non-defective, the manufactured part is accepted and processing ends at 1214. If the manufacture part is determined to be defective at 1210 by, for example, the manufacture inspector 1432 of the controller 1430 as shown in FIG. 14, then at 1212 it can be determined whether the manufacture part is repairable. If repairable, the manufactured part is reprocess or repaired at 1216, and then measured, inspected, and reevaluated at 1206, 1208, 1210, respectively. If the manufactured part is determined to be unrepairable at 1212, the process ends at 1214.

According to the method of FIG. 12, using a profile measurement system to accurately measure or assess coordinates or other features of a manufactured structure, a manufactured structure can be evaluated to determine if the structure is defective or non-defective. Further, if a manufactured structure is determined to be defective, reprocessing can be initiated if the part is deemed to be repairable based on design and actual structure dimensions and features. By repeating the measurement, inspection, and evaluation processes, defective parts can be reprocessed, and parts that are defective but that are not repairable can be discarded. The particular systems and methods of FIGS. 12 and 14 are exemplary only, and other arrangements can be used.

Figure 13:
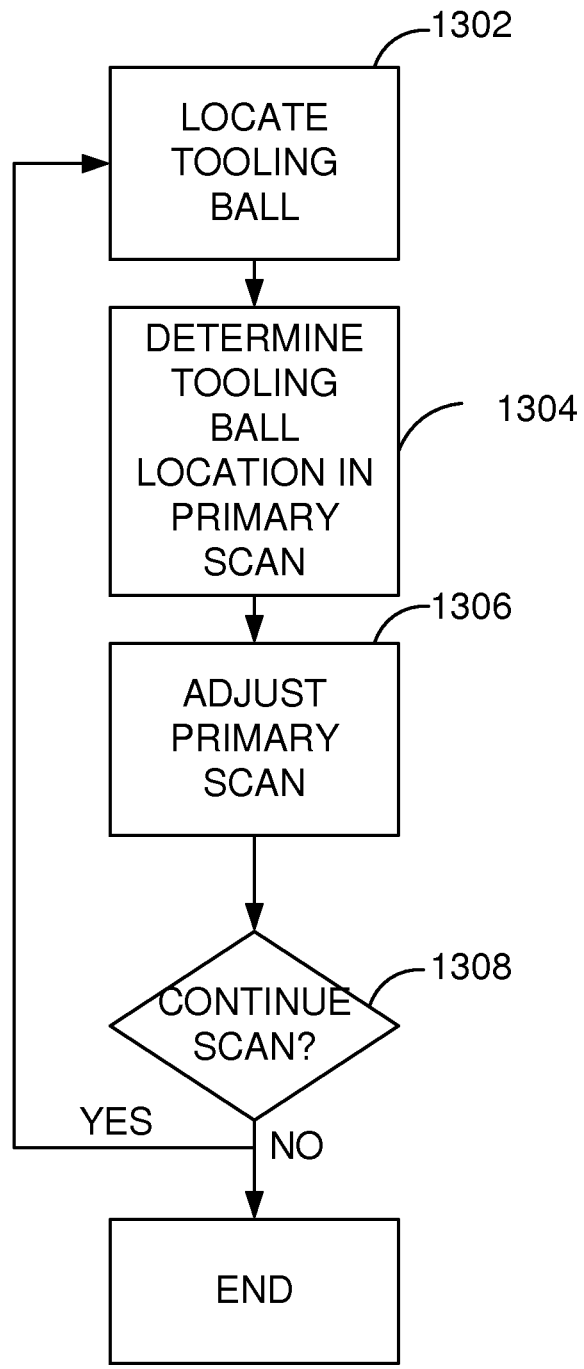
FIG. 13 is a block diagram of a representative method of tracking a tooling ball that is secured to a substrate or target.

FIG. 13 illustrates a representative method of tracking a tooling ball that is secured to a substrate or target. One or more tooling balls can be secured to a target to provide reference points for coordinate determinations. Tooling balls generally include a reflective ball-shaped surface in order to provide ample reflection of an interrogation beam in a laser-based measurement apparatus such as a laser radar.

As shown in FIG. 13, at 1302 a tooling ball location is identified and recorded based on returned portions of a scanned interrogation optical beam. The optical beam can be scanned in a variety of patterns such as circles, spirals, w's, or zig-zags so as to track a tooling ball. At 1304, the identified location is evaluated to determine a position with respect to a primary scan. The primary scan is adjusted at 1306 so that the tooling ball location is at a preferred location with respect to the primary scan. Typically, the primary scan is adjusted so that the tooling location is approximately centered within a primary scan range. At 1308, a determination is made regarding additional scanning.

FIG. 14 illustrates a representative manufacturing system 1400 suitable for producing one or more components of a ship, airplane, or part of other systems or apparatus, and for evaluating and reprocessing such manufactured components. The system 1400 typically includes a shape or profile measurement system 1405 such as the laser radar system as discussed above. The manufacturing system 1400 also includes a design system 1410, a shaping system 1420, a controller 1430, and a repair system 1440. The controller 1430 includes coordinate storage 1431 configured to store measured and design coordinates or other characteristics of one or more manufactured structures as designed and/or measured. The coordinate storage 1431 is generally a computer readable medium such as hard disk, random access memory, or other memory device. Typically, the design system 1410, the shaping system 1420, the shape measurement system 1405, and a repair system 1440 communicate via a communication bus 1415 using a network protocol.

The design system 1410 is configured to create design information corresponding to shape, coordinates, dimensions, or other features of a structure to be manufactured, and to communicate the created design information to the shaping system 1420. In addition, the design system 1410 can communicate design information to the coordinate storage 1431 of the controller 1430 for storage. Design information typically includes information indicating the coordinates of some or all features of a structure to be produced.

The shaping system 1420 is configured to produce a structure based on the design information provided by the design system 1410. The shaping processes provided by the shaping system 1420 can include casting, forging, cutting, or other process. The shape measurement system 1405 is configured to measure the coordinates of one or more features of the manufactured structure and communicate the information indicating measured coordinates or other information related to structure shape to the controller 1430.

A manufacture inspector 1432 of the controller 1430 is configured to obtain design information from the coordinate storage 1431, and compare information such as coordinates or other shape information received from the profile measuring apparatus such as described above with design information read out from the coordinate storage 1431. The manufacture inspector 1432 is generally provided as a processor and a series of computer-executable instructions that are stored in a tangible computer readable medium such as random access memory, a flash drive, a hard disk, or other physical devices. Based on the comparison of design and actual structure data, the manufacture inspector 1432 can determine whether or not the manufacture structure is shaped in accordance with the design information, generally based on one or more design tolerances that can also be stored in the coordinate storage 1431. In other words, the manufacture inspector 1432 can determine whether or not the manufactured structure is defective or non-defective. When the structure is not shaped in accordance with the design information (and is defective), then the manufacture inspector 1432 determines whether or not the structure is repairable. If repairable, then the manufacture inspector 1432 can identify defective portions of the manufactured structure, and provide suitable coordinates or other repair data. The manufacture inspector 1432 is configured to produce one or more repair instructions or repair data and forward repair instructions and repair data to the repair system 1440. Such repair data can include locations requiring repair, the extent of re-shaping required, or other repair data. The repair system 1440 is configured to process defective portions of the manufactured structure based on the repair data.

As described above, the present disclosure provides an optical assembly that is moveable as a unit with a laser radar system, and is configured to transmit a pointing beam and a measurement beam from the laser radar system, where they can be directed at a target at which the laser radar system is pointed. The disclosed technology is described herein in connection with a laser radar system of the type described in U.S. Pat. Nos. 4,733,609, 4,824,251, 4,830,486, 4,969,736, 5,114,226, 7,139,446, 7,925,134, and Japanese Patent No. 2,664,399, which are incorporated herein by reference, and from that description, the manner in which the disclosed technology can be implemented with various types of laser radar systems will be apparent to those of skill in the art.

Figure 15:
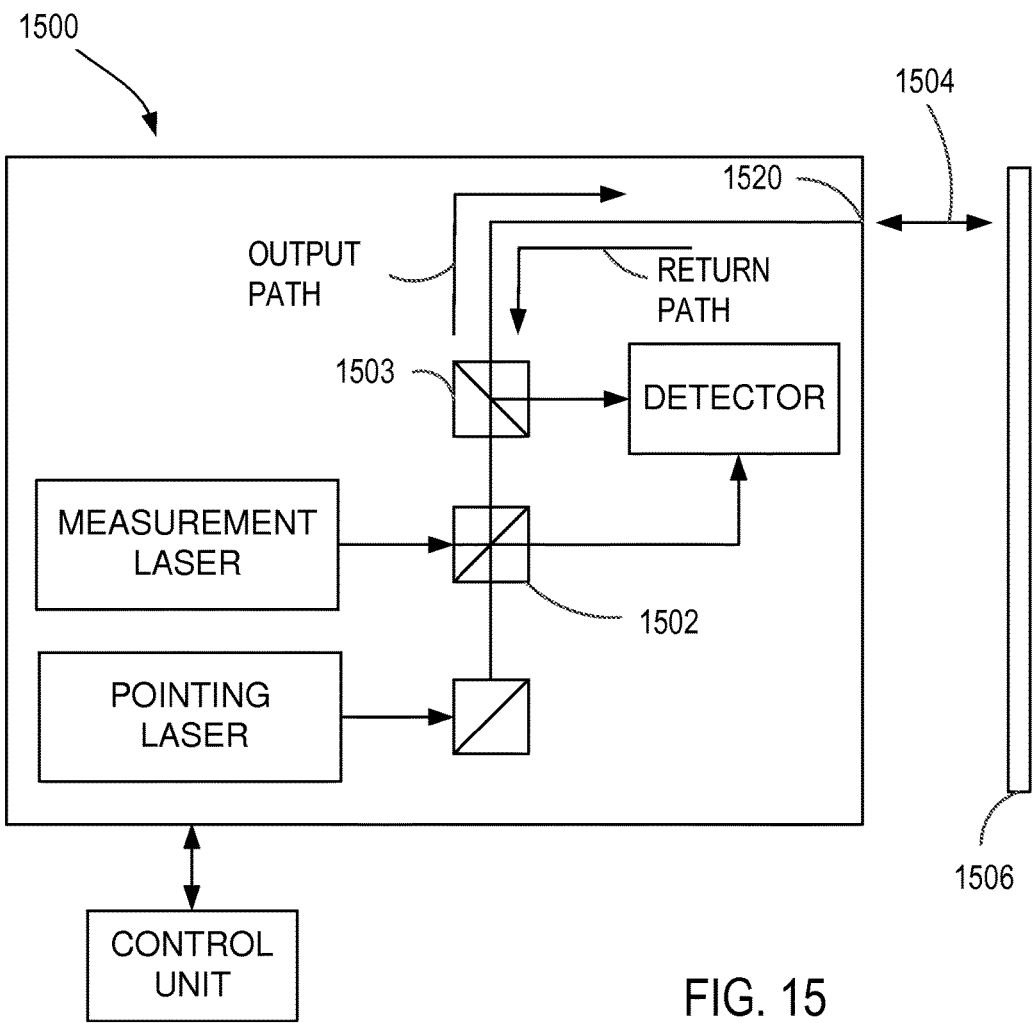
FIG. 15 is a schematic illustration of a laser radar system, of a type that can employ an optical assembly according to some embodiments.
Figure 16:
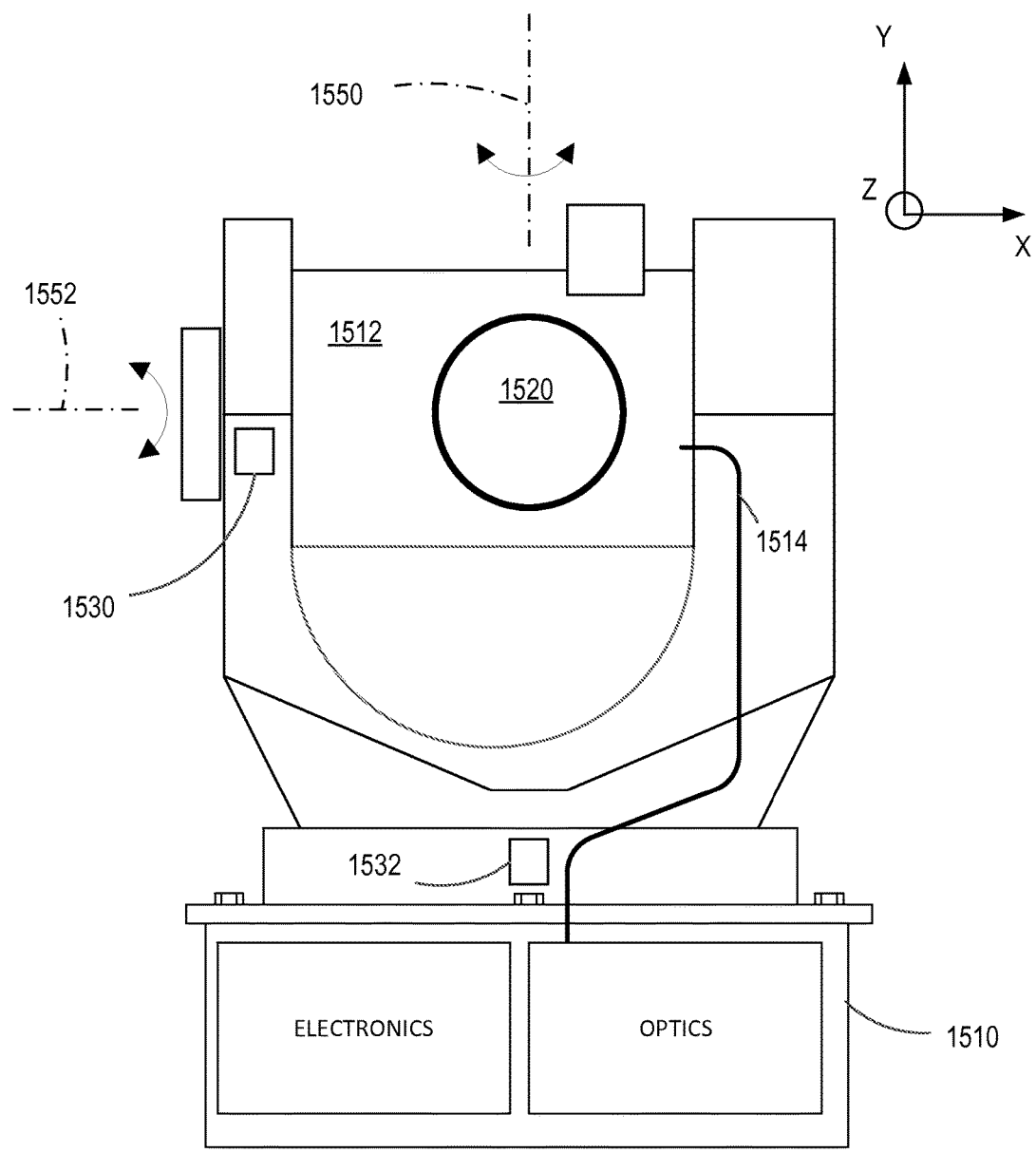
FIG. 16 is a front view of a preferred type of laser radar system that can employ an optical assembly according to some embodiments.

FIGS. 15 and 16 show a laser radar system 1500 that can be used with any or all of the disclosed embodiments, As shown in FIGS. 15 and 16, the laser radar system 1500 includes a pointing laser that produces a pointing beam in a visible (e.g., red) wavelength range, and a measurement laser that produces a measurement beam in a different (e.g., infrared or IR) wavelength range, and directs (transmits) the pointing and measurement beams to an output 1520 of the laser radar system 1500. The pointing beam is used to identify a point on a target 1506 at which the measurement beam is directed. The pointing beam laser source and the measurement beam laser source are generally different. A control unit can control the laser radar system 1500. In this embodiment, the laser radar system 1500 includes a control unit, but in other examples, a control unit can be provided separately and coupled to the laser radar system 1500.

The measurement beam may pass through a beam splitter 1502 which directs the measurement beam (and the pointing beam) along a measurement path 1504 to the target 1506. A portion of the measurement beam is directed by the beam splitter 1502 through a free space or fiber optic optical path 1508 so that a portion of the measurement beam is processed as described in U.S. Pat. Nos. 4,733,609, 4,824,251, 4,830,486, 4,969,736, 5,114,226, 7,139,446, 7,925,134, and Japanese Patent No. 2,664,399. The measurement beam portion that is directed along the measurement path 1504 is reflected from the target 1506 and a portion of the reflected or scattered measurement beam is received back at the laser radar system 1500, where it is directed to a detector by a beam splitter 1503. This beam portion is detected and processed to provide information about the target 1506. The detection and processing of the reflected or scattered radiation is provided in a base 1510 of the laser radar system 1500, and processing can be performed as described in U.S. Pat. Nos. 4,733,609, 4,824,251, 4,830,486, 4,969,736, 5,114,226, 7,139,446, 7,925,134, and Japanese Patent No. 2,664,399, which are incorporated herein by reference. Briefly, optical heterodyne detection provides a source light beam which is directed to a target, and a portion is reflected or scattered from the target and returned. The returned light beam is then mixed with a local oscillator light beam on a photodetector to provide optical interference signals which may be processed to provide detailed information about the target.

In a typical laser radar system, a moveable mirror is generally provided for directing the pointing beam and the measurement beam to a target. The moveable mirror can be separate from the optics that produce the measurement beam, and a relatively large laser radar housing may be required to accommodate both the moveable mirror and laser radar optics. One or more electrical motors such a motors 1530, 1532 are provided for moving the optical assembly. In such embodiments, the laser radar optical assembly is rotatable about two axes, such as axes 1550, 1552 as shown in FIG. 16 so that a pointing direction of the optical assembly can be selected as desired. One or more encoders can be provided for monitoring the position of the optical assembly and a control unit can control the electronic motors so as to position of the optical assembly.

As shown in FIG. 16, the laser radar system 1500 includes a housing 1512 (e.g. a rotatable cylinder) in which the optical assembly is located and secured, so that the optical assembly moves as a unit with the housing 1512 relative to the base 1510 of the laser radar system. An optical fiber 1514 communicates optical radiation (such as pointing and measurement beams) between the housing 1512 and the base 1510. The laser radar system includes an input/output aperture 1520 in the housing 1512, and through which radiation (e.g., the pointing and measurement beams) is directed from the laser radar system. The base 1510 contains the processing features of the laser radar system such as disclosed in U.S. Pat. Nos. 4,733,609, 4,824,251, 4,830,486, 4,969,736, 5,114,226, 7,139,446, 7,925,134, and Japanese Patent No. 2,664,399.

Figure 17:
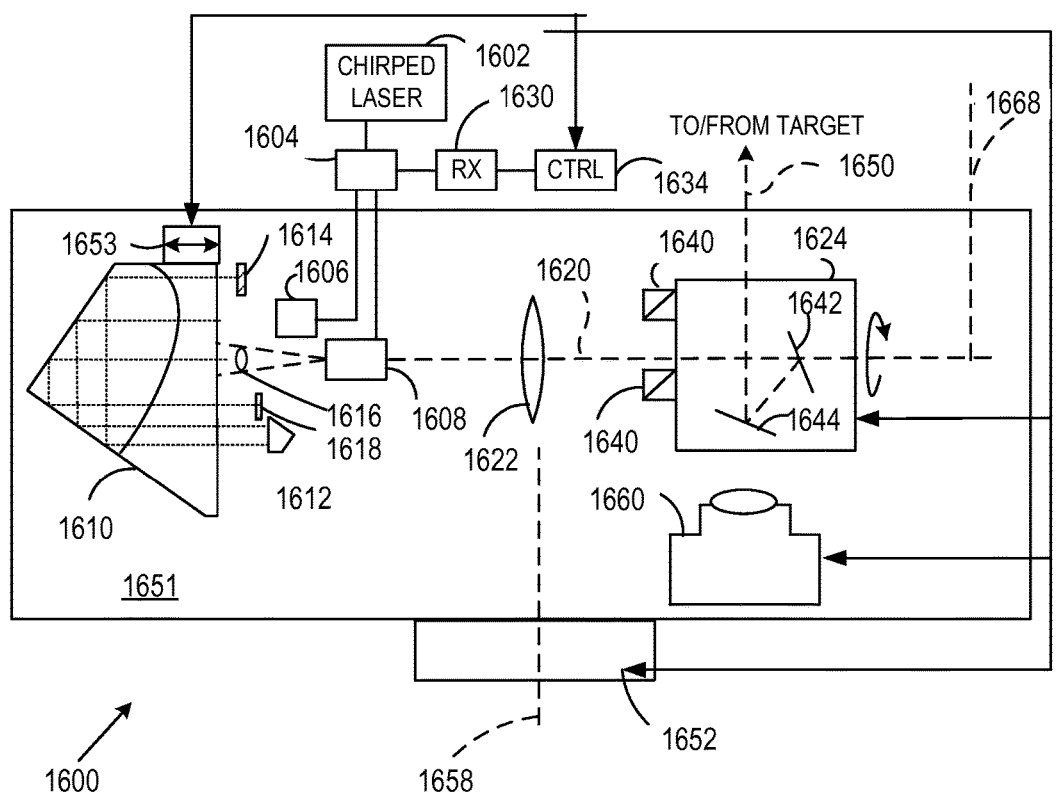
FIG. 17 is a schematic illustration of a laser radar system, of a type that can employ an optical assembly according to some embodiments.

FIG. 17 is a schematic illustration of a laser radar system of a type that can employ an optical assembly according the disclosed embodiments. With reference to FIG. 17, a laser radar system 1600 includes at least one chirped laser 1602 that is coupled to a fiber coupler 1604. The fiber coupler delivers portions of a chirped laser beam to a local oscillator beam optical system 1606 and a measurement beam optical system 1608 that produce an LO beam and a measurement beam, respectively. As shown in FIG. 16, the LO beam optical system 1606 is configured to couple the LO beam through a focus adjustment corner cube 1610 for reflection by an LO corner cube 1612 and an LO return reflector 1614, preferably implemented as a retroreflector. The measurement beam pickup/delivery optical system 1608 directs a diverging measurement beam 1616 to the focus adjustment corner cube 1610 and to a return reflector 1618. In this configuration, the LO is a "remote LO" in that path differences associated with the focus adjustment corner cube 1610 are substantially the same for the measurement optical path and the LO optical path, i.e., four passes through the focus adjustment corner cube 1610 for the LO beam and the measurement/return beams.

The laser radar system 1600 is configured so that the measurement beam is directed along an axis 1620 to an objective lens 1622 to an elevational scan assembly 1624. A return beam is collected by the objective lens 1622 and coupled to the fiber coupler 1604 along a reverse of the measurement beam optical path. A receiver 1630 is coupled to receive the combined beams and produce a signal at a heterodyne frequency that is coupled to a system controller 1634 configured to provide range estimates based on heterodyne frequencies.

The elevational scan assembly 1624 includes bearings 1640 configured for rotation about the axis 1620. The bearings 1640 typically include encoders as well that permit determination of rotational angle. First and second reflectors 1642, 1644 are situated to direct the measurement beam along a rotatable axis 1650. The elevational scan assembly 1624 and the LO and measurement beam optical systems can be secured to a base 1651 that is coupled to an second scanner 1652 that is configured to rotate the base 1650 about an axis 1658. Scanning of the measurement beam is directed by the control system 1634 that is coupled to the elevational scan assembly 1624 and the secondary scanner 1652. The control system 1634 is also coupled to a translation stage 1653 that is situated to translate the focus adjustment corner cube 1610 in a direction parallel to the axis 1620 so as to focus the measurement beam at a target surface.

A camera 1660 can also be provided for viewing a target area. The camera 1660 can be situated to image along the axis 1650 through the reflector 1644. In representative examples, the measurement beam is an infrared or near-infrared beam and the reflector 1644 can be configured to transmit a visible beam and reflect the measurement beam. For example, the reflector 1644 can be a so-called "hot mirror" that reflects infrared radiation and transmits visible radiation. In other examples, the camera 1660 is situated to image along an axis 1668 that is displaced from and possibly tilted with respect to the measurement axis 1650. The camera 1660 is generally fixed with respect to or secured to the elevational scan assembly 1634 so that a visible image of a target can be obtained or monitored during scanning. In addition, since the camera 1660 moves with and is aligned to the measurement beam, the camera output image can be used in a variety of ways to provide additional metrology information.

In the above embodiments, measurements are carried out by a laser radar by directing a measurement beam to a target surface. In other examples, a laser based tool such a laser radar or laser tracker can direct one or more beams to suitable targets such as mirrors, corner cubes, tooling balls, or other reflectors. In some cases, a target surface may be provided with a zero or low retardance coating.

In view of the many possible embodiments to which the principles of the disclosed technology may be applied, it should be recognized that the illustrated embodiments are only preferred examples and should not be taken as limiting the scope of the invention. Rather, the scope of the invention is defined by the following claims. I therefore claim as my invention all that comes within the scope and spirit of these claims.

I claim:

1. A focus system for a laser radar, comprising:
    a prism that includes a plurality of reflective surfaces, wherein at least one surface is situated to receive an interrogation optical beam in a first state of polarization and reflect the interrogation optical beam in a second state of polarization, wherein the at least one surface of the prism provides a retardance to the interrogation optical beam in the first state of polarization to produce the interrogation optical beam in the second state of polarization; and
    a return reflector situated to receive the interrogation optical and reflect the interrogation optical beam back to the prism, wherein the prism is translatable with respect to the return reflector so as to establish a focus distance for the interrogation optical beam at a target.

2. The focus system of claim 1, wherein the return reflector is situated to direct the interrogation optical beam received in the second state of polarization to the prism.

3. The focus system of claim 2, wherein the return reflector is situated to direct the interrogation optical beam received in the second state of polarization to the to the prism in a third state of polarization, and the prism is situated so the plurality of reflective surfaces produce an output interrogation optical beam in a fourth state of polarization.

4. The focus system of claim 1, wherein the plurality of reflective surfaces provides a one-eighth wave linear retardation to the interrogation optical beam in the first state of polarization to produce the interrogation optical beam in the second state of polarization.

5. The focus system of claim 1, wherein the prism is a corner cube, and the at least one surface provides a one-eighth wave retardation.

6. The focus system of claim 5, wherein the prism includes a first surface that receives the interrogation beam from a beam source, wherein the first surface provides a retardance of about one-eighth wave.

7. The focus system of claim 6, wherein the first surface has a surface coating that provides the one-eighth wave retardance.

8. The focus system of claim 6, wherein the one-eighth wave retardance is produced based on an angle of incidence to the first surface and a prism refractive index.

9. The focus system of claim 6, wherein the prism includes a second surface that receives the interrogation beam from the first surface, wherein the second surface has a coating that provides a retardance of less than $\lambda/50$, $\lambda 100$, or $\lambda/200$.

10. The focus system of claim 9, wherein the prism is a solid corner cube.

11. The focus system of claim 9, wherein the prism is an air spaced corner cube.

12. A laser radar, comprising:
a laser that produces an interrogation optical beam in a first state of polarization;
an objective lens situated to direct the interrogation optical beam to a target in a second state of polarization and receive a portion of the interrogation optical beam returned from the target; and
a focus optical system that includes a retroreflector and a return reflector, wherein at least one of the retroreflector and the return reflector is translatable with respect to the objective lens so as to shape the interrogation beam at the target, and further wherein at least one surface of the retroreflector provides a retardance to the interrogation optical beam in the first state of polarization to produce the interrogation optical beam in the second state of polarization.

13. The laser radar of claim 12, wherein the first state of polarization is a linear state of polarization and the second state of polarization is a circular state of polarization.

14. The laser radar of claim 13, wherein the retroreflector is situated to provide a one-eighth wave retardance for input beam propagation from an input surface of the retroreflector to the return reflector.

15. The laser radar of claim 14, wherein the retroreflector provides the one-eighth wave retardance based on reflection at a selected reflective surface of the retroreflector.

16. The laser radar of claim 15, wherein the selected reflective surface of the retroreflector is oriented with respect to the interrogation beam to provide one-eighth wave retardance by total internal reflection.

17. The laser radar of claim 16, further comprising a multilayer coating situated at the selected reflective surface of the retroreflector, wherein the one-eighth wave retardance is provided by the multilayer coating.

18. The laser radar of claim 15, further comprising a low retardance coating situated at a least one reflective surface of the retroreflector that is different than the selected reflective surface.

19. The laser radar of claim 15, wherein the retroreflector is a corner cube prism, an air corner cube, or a roof prism.

20. The laser radar of claim 19, wherein the retroreflector is a crown glass corner cube prism situated so that an angle of incidence of the interrogation optical beam to the selected surface is between 47 and 53 degrees.

21. A method of interrogating a target, comprising:
directing an input interrogation optical beam in a first state of polarization to a retroreflector that produces an output interrogation optical beam in a second state of polarization;
adjusting a focus of the output interrogation optical beam at the target by translation of the retroreflector, wherein at least one surface of the retroreflector provides a retardance to the interrogation optical beam in the first state of polarization to produce the interrogation optical beam in the second state of polarization;
detecting a portion of the output interrogation optical beam received from the target; and
based on the detected portion, estimating at least one of a target dimension or position.

22. The method of claim 21, wherein the first state of polarization is a linear state of polarization and the second state of polarization is a circular state of polarization.

23. The method of claim 22, further comprising producing the output interrogation optical beam in the second state of polarization by total internal reflection at a selected surface of the retroreflector.

24. The method of claim 22, further comprising producing the output interrogation optical beam in the second state of polarization by total internal reflection at a multilayer coated surface of the retroreflector.

25. An apparatus for measuring a distance to a target, comprising:
a laser source that produces a measurement beam in a first state of polarization;
a focus optical system that includes a retroreflector, the focus optical system situated to direct the measurement beam in a second state of polarization to the target, wherein at least one surface of the retroreflector provides a retardance to the interrogation optical beam in the first state of polarization to produce the interrogation optical beam in the second state of polarization;
a stage coupled to the focus optical system and movable along a first axis so as to select a propagation distance to the target of the measurement beam in the second state of polarization; and
a detector that detects a reflected portion of the measurement beam from the target, wherein reflected portions in the first state of polarization are converted into the second state of polarization by the focus optical system reflector.

26. The apparatus of claim 25, wherein the first state of polarization is a linear state of polarization and the second state of polarization is a circular state of polarization.

27. The apparatus of claim 26, wherein the retroreflector provides a one-eighth wave retardance based on reflection at a selected reflective surface of the retroreflector.

28. The apparatus of claim 27, further comprising a low retardance coating situated on at a least one reflective surface of the retroreflector other than the selected reflective surface.

29. The apparatus of claim 26, wherein a portion of the measurement beam returned from the target in a third state of polarization is converted to a fourth state of polarization measurement beam based on a material applied to at least one surface of the reflector of the focus optical system.

30. The apparatus of claim 29, wherein the fourth state of polarization is a linear state of polarization and the third state of polarization is a circular state of polarization.

31. The apparatus of claim 29, wherein the fourth state of polarization is the same as the first state of polarization.

32. The apparatus of claim 31, wherein the first state of polarization is a linear state of polarization.

33. The apparatus of claim 32, wherein the third state of polarization is a circular state of polarization.

34. The apparatus of claim 25, further comprising an optical fiber that couples the measurement beam to the focus optical system beam in the first state of polarization.

35. The apparatus of claim 25, further comprising an optical fiber that receives the reflected portion of the measurement beam from the target, and couples the reflected portion to the detector.

36. The apparatus of claim 25, wherein the retroreflector of the focus optical systems includes at least one reflective surface that provides a one-eight wave linear retardance, and at least one reflective surface that provides substantially zero retardance to the measurement beam.

* * * * *

UNITED STATES PATENT AND TRADEMARK OFFICE
CERTIFICATE OF CORRECTION

PATENT NO. : 10,197,668 B2
APPLICATION NO. : 14/914616
DATED : February 5, 2019
INVENTOR(S) : Smith It is certified that error appears in the above-identified patent and that said Letters Patent is hereby corrected as shown below:

In the Claims

In Column 14, Line 46, Claim 3, "received in the second state of polarization to the to the" should read --received in the second state of polarization to the--.

In Column 15, Line 46, Claim 18, "retardance coating situated at a least one reflective surface of" should read --retardance coating situated at least one reflective surface of--.

In Column 16, Line 41, Claim 28, "retardance coating situated on at a least one reflective surface of" should read --retardance coating situated on at least one reflective surface of--.

Signed and Sealed this
Twentieth Day of July, 2021

Drew Hirshfeld
*Performing the Functions and Duties of the*
*Under Secretary of Commerce for Intellectual Property and*
*Director of the United States Patent and Trademark Office*